(12) United States Patent
Opris et al.

(10) Patent No.: US 6,622,927 B2
(45) Date of Patent: Sep. 23, 2003

(54) LOW VOLTAGE THERMOSTAT CIRCUIT

(76) Inventors: Ion E. Opris, 2198 Lark Hills Ct., San Jose, CA (US) 95138; Jay Friedman, 395 West Dr., Felton, CA (US) 95018

( * ) Notice: Subject to any disclaimer, the term of this patent is extended or adjusted under 35 U.S.C. 154(b) by 71 days.

(21) Appl. No.: 09/850,768
(22) Filed: May 8, 2001
(65) Prior Publication Data
US 2002/0179299 A1 Dec. 5, 2002

(51) Int. Cl.[7] .............................................. G05D 23/00
(52) U.S. Cl. .................................. 236/78 B; 236/91 G
(58) Field of Search ............................. 236/78 D, 78 R, 236/78 B, 74 R, 91 R, 91 E, 91 G, 94; 340/584, 585, 586, 595, 599; 62/126, 127, 129, 130; 165/11.1, 287, 288, 290, 291, 292, 293

(56) References Cited

U.S. PATENT DOCUMENTS

| | | | |
|---|---|---|---|
| 2,949,237 A | * 8/1960 | De Wilde | 236/78 B |
| 5,070,932 A | * 12/1991 | Vlasak | 236/91 G |
| 5,231,848 A | * 8/1993 | Farr | 62/230 X |
| 5,463,874 A | * 11/1995 | Farr | 62/126 |

* cited by examiner

*Primary Examiner*—Harry B. Tanner
(74) *Attorney, Agent, or Firm*—Fliesler, Dubb, Meyer & Lovejoy, LLP

(57) ABSTRACT

A thermostat circuit (FIG. 4) is provided which (i) works properly with very low supply voltages, (ii) does not need a separate constant value as a reference, and (iii) has improved temperature sensitivity over prior art thermostat circuits. The thermostat circuit compares two reference currents—$I_{PTAT}$ and $I_{VBE}$. When $I_{VBE} > I_{PTAT}$, the output of the thermostat circuit is one logic state (either high or low). When $I_{PTAT} > I_{VBE}$, the output of the thermostat circuit is a different logic state (either low or high). Current $I_{PTAT}$ comes from a PTAT current generator (FIGS. 5–7), and current $I_{VBE}$ comes from a $V_{BE}$ current generator (FIGS. 8–10). The PTAT current generator and the $V_{BE}$ current generator may be implemented with cascode amplifiers. In an embodiment, the currents $I_{PTAT}$ and $I_{VBE}$ can be compared at a current comparator circuit (FIG. 11) with a summing node and an output node. The total current at the current comparator's output node is independent of temperature, and the output node exhibits a hysteresis behavior. The thermostat circuit can include a testing/tuning circuit (FIG. 12) which is capable of injecting a test current into or subtracting a test current out of the summing node.

13 Claims, 12 Drawing Sheets

LOW VOLTAGE THERMOSTAT CIRCUIT

BACKGROUND OF THE INVENTION

1. Field of the Invention

The present invention relates to electrical circuits, and in particular to a thermostat circuit with an output that indicates when the circuit's temperature is above or below a certain predetermined value.

2. Description of the Related Art

FIG. 1—Prior Art

FIG. 1 shows a block diagram of a prior art thermostat circuit 100. Thermostat circuit 100 comprises a constant voltage generator 105, a proportional to absolute temperature ("PTAT") voltage generator 110, and a current comparator 115. The constant voltage generator 105 generates a reference voltage $V_{REF}$ which is fed into the comparator 115. Similarly, the PTAT voltage generator 110 generates a PTAT voltage $V_{PTAT}$ which is fed into the comparator 115. When $V_{PTAT} > V_{REF}$, the output 120 is one logic state. When $V_{REF} > V_{PTAT}$, the output 120 is a different logic state.

Because $V_{PTAT}$ is proportional to temperature, this prior art thermostat circuit indicates when the circuit's temperature is above or below a certain temperature. $V_{REF}$ is set to equal $V_{PTAT}$ at this temperature.

There are at least two disadvantages associated with the circuit of FIG. 1: (i) it will not function properly for very low supply voltages, and (ii) it requires a separate constant value as a reference. In addition, it is always desirable to have a thermostat circuit with better temperature sensitivity.

FIG. 2—Prior Art

FIG. 2 shows a prior art PTAT current generator. This circuit is built with current sources $I_1$–$I_2$, npn bipolar junction transistors $Q_1$–$Q_2$, resistor $R_1$, and operational amplifier ("opamp") $A_1$. Opamp $A_1$ has a noninverting input terminal (node $n_1$), an inverting input terminal (node $n_2$), and an output terminal (node $n_3$).

Current sources $I_1$–$I_2$ are implemented so that each current source produces a substantially equal current $I_{PTAT}$. This can be done, for example, by utilizing PMOS transistors. In such an implementation, the sources of the PMOS transistors are connected to $V_{cc}$, and the gates of the PMOS transistors are connected together in a current mirror configuration to node $n_3$.

Transistor $Q_2$ is N times larger in size than transistor $Q_1$. Initially, with $Q_2$ larger than $Q_1$, and equal current from $I_1$–$I_2$, the voltage across $Q_1$ will be N times larger than the voltage across $Q_2$. Thus, node $n_2$ will be driven higher than node $n_1$. This will cause the voltage at node $n_3$ to decrease. Decreasing the voltage at node $n_3$ causes current $I_{PTAT}$ from current sources $I_1$–$I_2$ to increase. Current $I_{PTAT}$ will increase until the voltage across resistor $R_1$ balances the voltage difference between transistors $Q_1$ and $Q_2$.

The voltage difference between transistors $Q_1$ and $Q_2$ is proportional to absolute temperature, and can be expressed as:

$$\Delta V_{BE} = \frac{kT}{q} \cdot \ln(N) \tag{1}$$

The current $I_{PTAT}$ is determined by a PTAT voltage drop on the resistor $R_1$:

$$I_{PTAT} = \frac{\Delta V_{BE}}{R_1} = \frac{kT}{q \cdot R_1} \cdot \ln(N) \tag{2}$$

FIG. 3—Prior Art

FIG. 3 shows a prior art $V_{BE}$ current generator. This circuit is built with current sources $I_3$–$I_4$, npn bipolar junction transistor $Q_3$, resistor $R_2$, and opamp $A_2$. Opamp $A_2$ has a noninverting input terminal (node $n_{11}$), an inverting input terminal (node $n_{12}$), and an output terminal (node $n_{13}$).

Current sources $I_3$–$I_4$ are implemented so that each current source produces a substantially equal current $I_{VBE}$. This can be done, for example, by utilizing PMOS transistors, as described above with respect to current sources $I_1$–$I_2$.

Because current sources $I_3$–$I_4$ produce a substantially equal current $I_{VBE}$, the voltage across transistor $Q_3$ appears across resistor $R_2$. Therefore, the current $I_{VBE}$ is given by:

$$I_{VBE} = \frac{V_{BE_1}}{R_2} \tag{3}$$

SUMMARY OF THE INVENTION

In accordance with the present invention, a thermostat circuit is provided which (i) works properly with very low supply voltages, (ii) does not need a separate constant value as a reference, and (iii) has improved temperature sensitivity.

In accordance with the present invention, as illustrated in FIG. 4, current $I_{PTAT}$ from the prior art PTAT current generator and current $I_{VBE}$ from the prior art $V_{BE}$ current generator are fed into a current comparator. When $I_{VBE} > I_{PTAT}$, the output is one logic state (either high or low). When $I_{PTAT} > I_{VBE}$, the output is a different logic state (either low or high).

Another aspect of the present invention is the implementation of the $I_{PTAT}$ and $I_{VBE}$ current generators. One implementation shown in FIGS. 5 and 8 uses only substrate pnp bipolar devices, which are the bipolar devices usually available in CMOS technology. Using only substrate pnp bipolar devices has the additional advantage of an operating supply voltage that could be below 1 V.

Another implementation is shown in FIGS. 6 and 9 which has improved power supply rejection. Improved power supply rejection is obtained by cascoding current source transistors $M_1$ and $M_2$ using cascode transistors $M_5$ and $M_6$. And yet another implementation shown in FIGS. 7 and 8 includes a secondary loop for biasing cascode transistors $M_1$ and $M_2$ properly when the voltage between nodes n11 and n12 is not $I_{VBE}$.

Another aspect in accordance with the present invention is the implementation of a current comparator. In one embodiment shown in FIG. 11, the current comparator is implemented so as to enable a hysteresis behavior.

Another aspect in accordance with the present invention is a circuit shown in FIG. 12 which can be used in order to test or tune a low-voltage thermostat circuit in accordance with the present invention at room temperature.

BRIEF DESCRIPTION OF THE DRAWINGS

Further details of the present invention are explained with the help of the attached drawings in which.

DETAILED DESCRIPTION

FIG. 4

Figure 3:
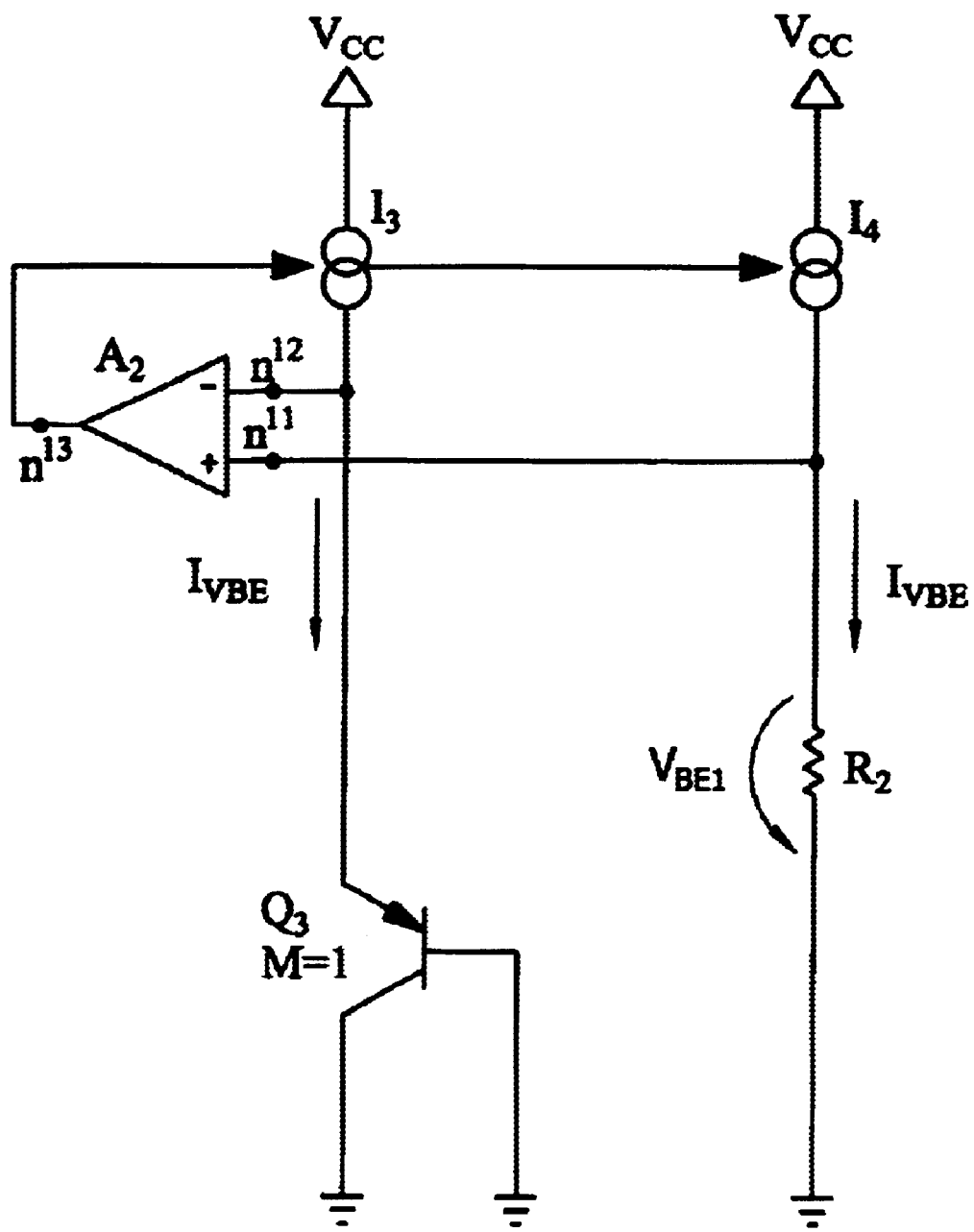
FIG. 3 shows a prior art $V_{BE}$ current generator.
Figure 4:
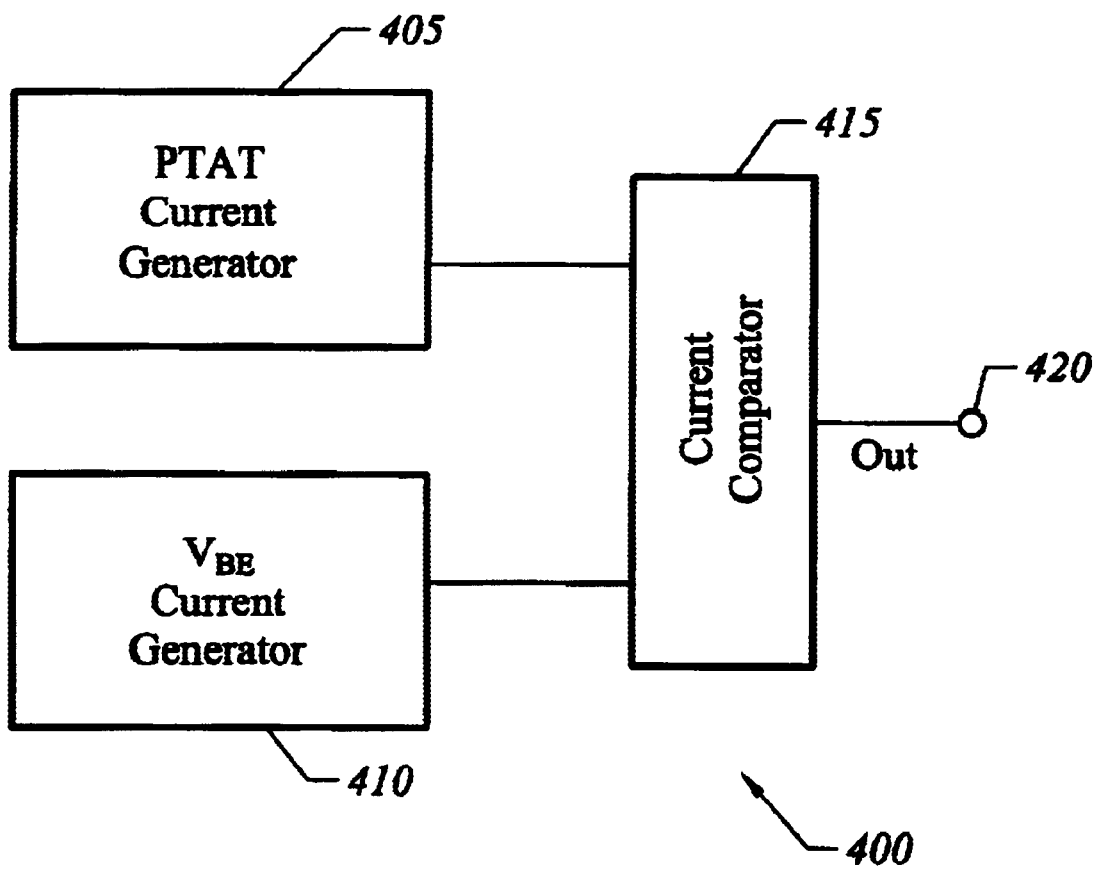
FIG. 4 shows a block diagram illustrating a thermostat circuit in accordance with the present invention.

FIG. 4 shows a block diagram illustrating a thermostat circuit in accordance with the present invention. This embodiment comprises a PTAT current generator 405, a $V_{BE}$ current generator 410, and a current comparator 415. The prior art PTAT current generator shown in FIG. 2 could be used to implement the PTAT current generator 405. Similarly, the prior art $V_{BE}$ current generator shown in FIG. 3 could be used to implement the $V_{BE}$ current generator 410.

Current $I_{PTAT}$ from the PTAT current generator 405 and current $I_{VBE}$ from the $V_{BE}$ current generator 410 are fed into the current comparator 415. When $I_{VBE} > I_{PTAT}$, the output 420 is one logic state (either high or low). When $I_{PTAT} > I_{VBE}$, the output 420 is a different logic state (either low or high).

Figure 1:
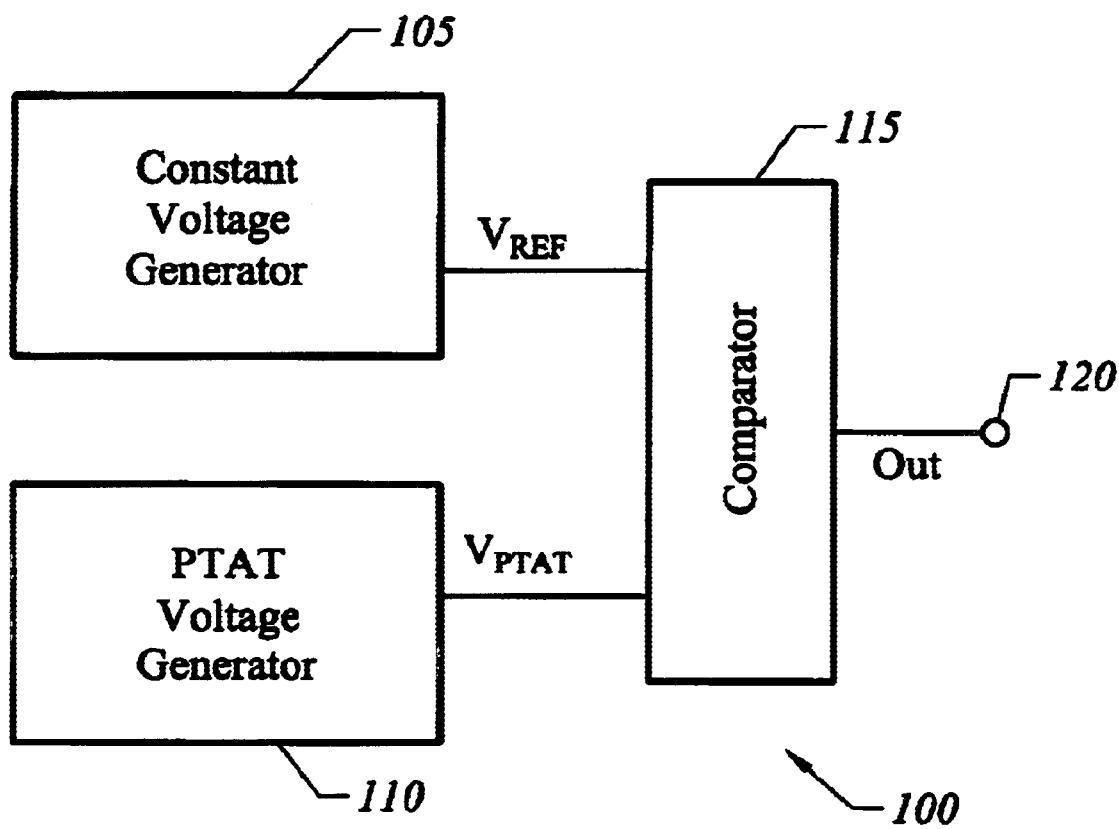
FIG. 1 shows a block diagram of a prior art thermostat circuit.

The circuit shown in FIG. 4 possesses at least two advantages over the thermostat circuit described above. First, there is no need for a separate constant value as a reference. Second, the point where $I_{VBE} = I_{PTAT}$ (the "crossing point") has better temperature sensitivity than the prior art thermostat circuit in FIG. 1, because it involves two variables with temperature coefficients of opposite signs.

FIG. 5

Figure 2:
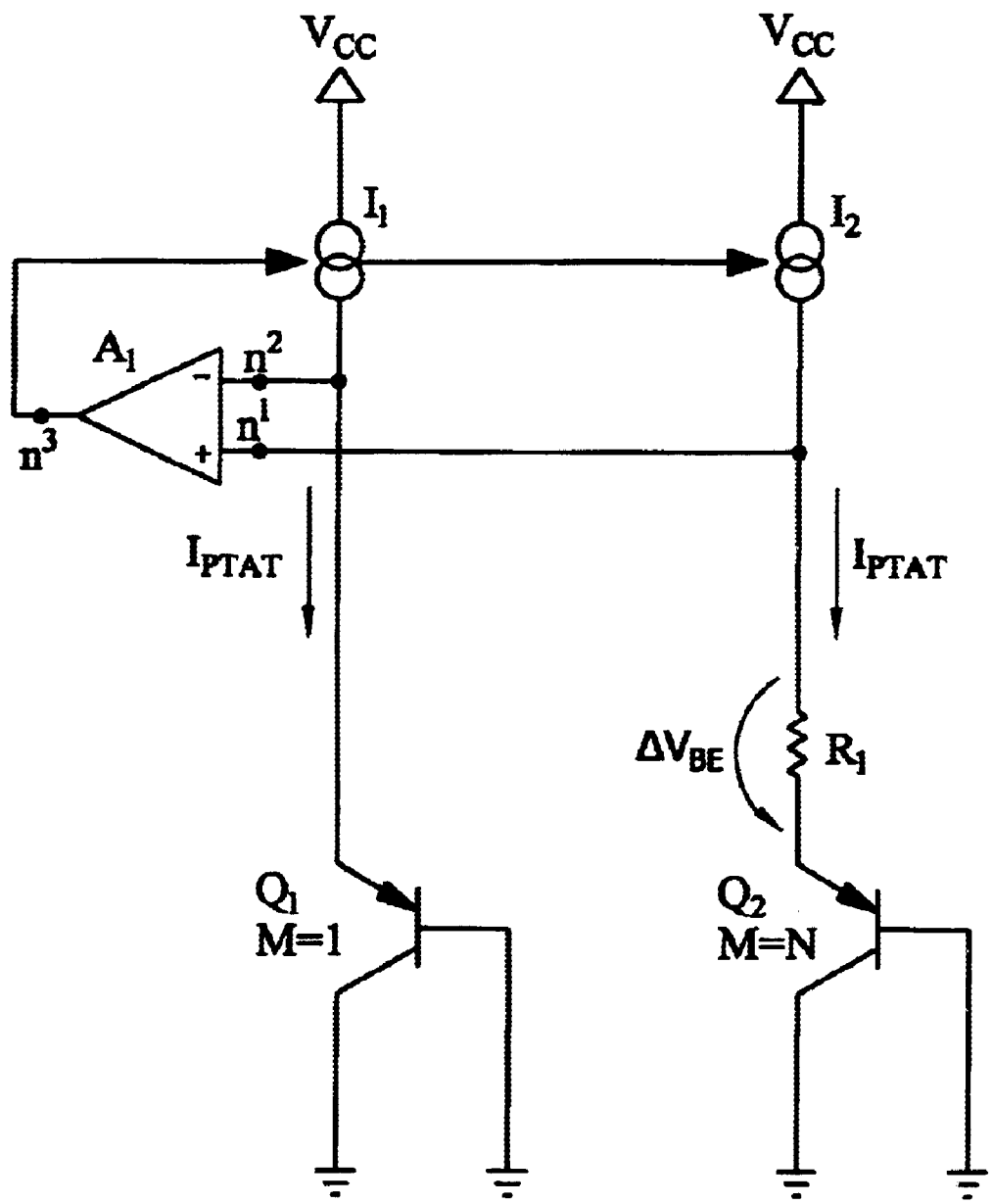
FIG. 2 shows a prior art PTAT current generator.
Figure 5:
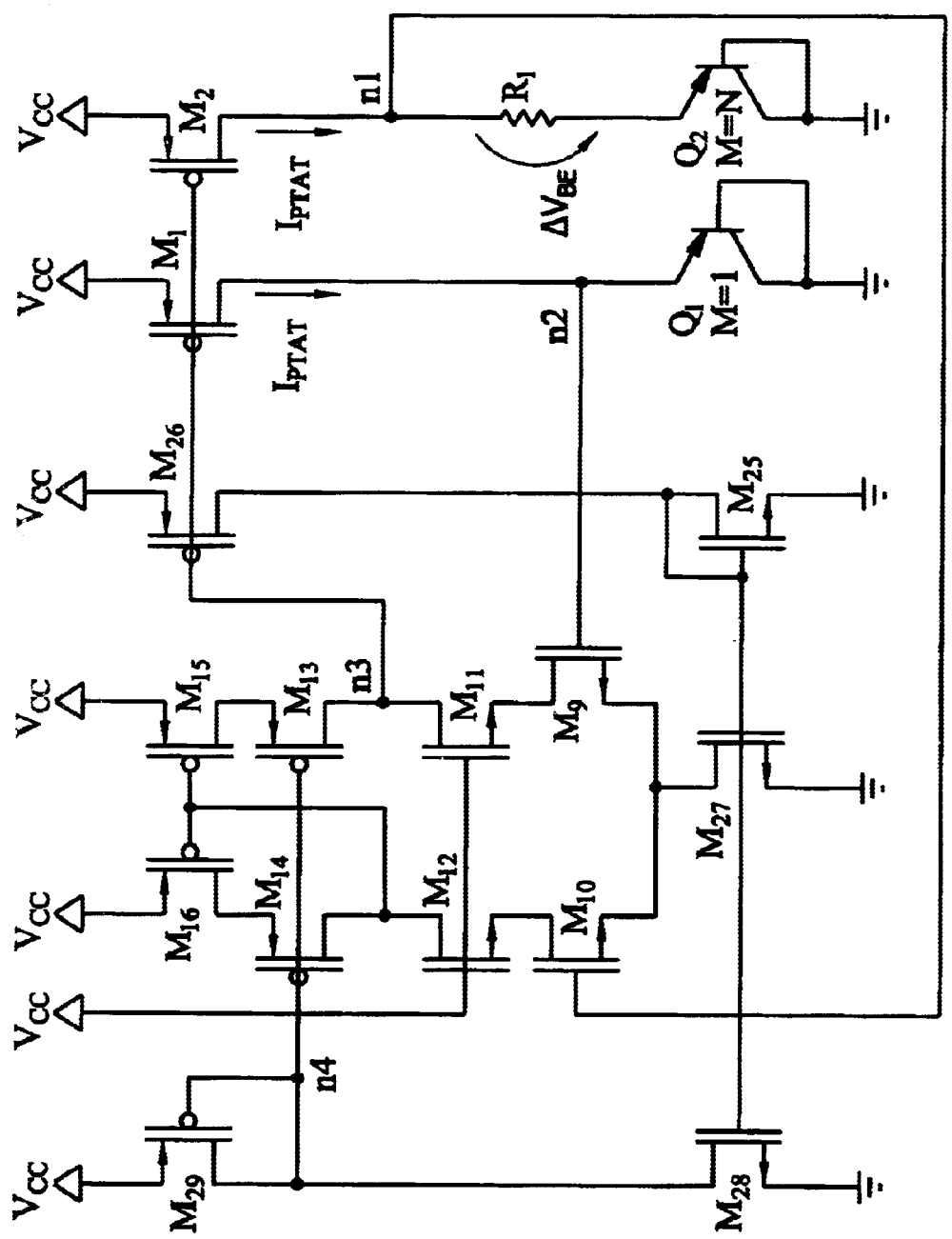
FIG. 5 shows a more detailed embodiment of the $I_{PTAT}$ current generator in accordance with the present invention.

FIG. 5 shows a more detailed embodiment of the $I_{PTAT}$ current generator 405 in accordance with the present invention. As in FIG. 2, this implementation comprises pnp bipolar transistors $Q_1$ and $Q_2$ and resistor $R_1$. Current sources $I_1$ and $I_2$ in FIG. 2 are implemented with transistors $M_1$ and $M_2$ in FIG. 5. Opamp $A_1$ in FIG. 2 is implemented with transistors $M_9$–$M_{16}$ and $M_{25}$–$M_{29}$ in FIG. 5.

Because the gate and the source terminals of transistors $M_1$–$M_2$ are connected to node $n_3$ and $V_{cc}$ respectively, transistors $M_1$–$M_2$ have substantially identical gate-to-source voltages. Consequently, the magnitude of the current $I_{PTAT}$ generated by transistors $M_1$–$M_2$ is substantially equal.

The implementation of opamp $A_1$ comprises two sections: the amplifier section, and the biasing section. The amplifier section consists of transistors $M_9$–$M_{16}$. The biasing section consists of transistors $M_{25}$–$M_{29}$.

The amplifier section is implemented as a cascode amplifier with transistors $M_9$–$M_{16}$. The cascode amplifier has the advantage of a large gain in a single stage, which simplifies frequency compensation. Transistors $M_9$–$M_{16}$ work together with current sources $M_1$–$M_2$ to drive the voltage on nodes $n_1$ and $n_2$ to equal values. Transistor pairs $M_{13}$–$M_{14}$ and $M_{15}$–$M_{16}$ are each connected in a current mirror configuration, so the same current drives the drains of transistors $M_{11}$ and $M_{12}$. With $n_2$ above $n_1$, transistors $M_9$ and $M_{11}$ will turn on to a greater degree than transistors $M_{10}$ and $M_{12}$. Thus, the voltage on node $n_3$ will decrease. With the voltage on node $n_3$ decreasing, $I_{PTAT}$ current sources $M_1$–$M_2$ will turn on more strongly. Current $I_{PTAT}$ will increase from $M_1$–$M_2$ until the voltage drop across resistor $R_1$ equals a voltage difference $ÎV_{BE}$ across transistors $Q_1$ and $Q_2$.

The biasing section is implemented with transistors $M_{25}$–$M_{29}$. Transistor $M_{26}$ provides a replica of the $I_{PTAT}$ current. Transistor pairs $M_{25}$-$M_{27}$ and $M_{25}$-$M_{28}$ are connected in a current mirror configuration, so that transistors $M_{27}$ and $M_{28}$ each sink a current roughly equal to the $I_{PTAT}$ current. This ensures that transistors $M_{13}$-$M_{14}$ and $M_9$–$M_{10}$ are properly biased. The bias for transistors $M_{11}$–$M_{12}$ can be the $V_{CC}$ rail or a separate bias point.

A separate circuit is needed to avoid a stable state with zero currents in all branches. Although such a circuit is not shown, the implementation of such a circuit would be readily apparent to one of ordinary skill in the art.

One advantage of the implementation in FIG. 5 is that it uses only substrate pnp bipolar devices, which are the only bipolar devices usually available in plain CMOS technologies. Another advantage is the low operating supply voltage. Because the minimum operating supply voltage is basically one $V_{BE}$ plus one $V_{DSAT}$ for an MOS device, the operating supply voltage could be below 1 V.

FIG. 6

Figure 6:
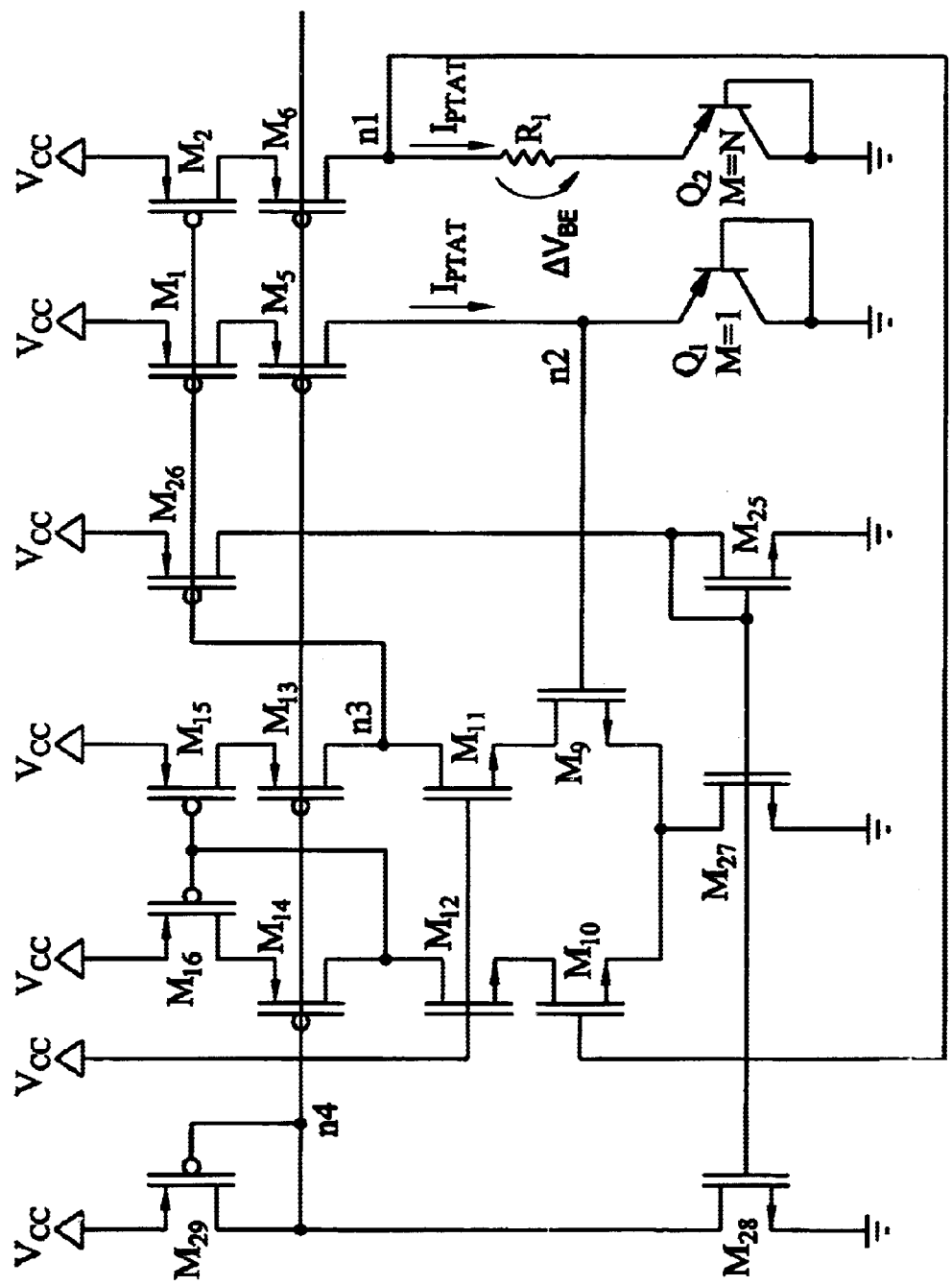
FIG. 6 shows another embodiment of the $I_{PTAT}$ current generator in accordance with the present invention.

FIG. 6 shows another embodiment of the $I_{PTAT}$ current generator 405. The only difference between the circuit of FIG. 5 and the circuit of FIG. 6 is that current sources $M_1$ and $M_2$ are cascoded with transistors $M_5$ and $M_6$, respectively. This improves the power supply rejection, or in other words, it reduces the effect of power supply variations on the $I_{PTAT}$ current. However, this improvement is obtained at the expense of a slightly large minimum operating voltage, since $V_{cc}$ must be greater than two $V_{DSAT}$ voltages in order to keep current sources $M_1$–$M_5$ and $M_2$–$M_6$ from saturating.

The bias current source $M_{26}$ could also be implemented with a cascode device in accordance with the present invention. However, such an implementation would require a more complicated start-up circuit to avoid a stable state with zero currents in all branches.

FIG. 7

One of the implicit assumptions in the above description of FIGS. 5–6 is that transistors $M_9$ and $M_{10}$ are properly biased. In FIGS. 5 and 6 the input voltage at nodes $n_1$ and $n_2$ is one $V_{BE}$. So this assumption is correct if the threshold voltage of transistors $M_9$ and $M_{10}$ is less than one $V_{BE}$. Unfortunately, this cannot be guaranteed for all CMOS processes, or even for the same process over all corners.

Figure 7:
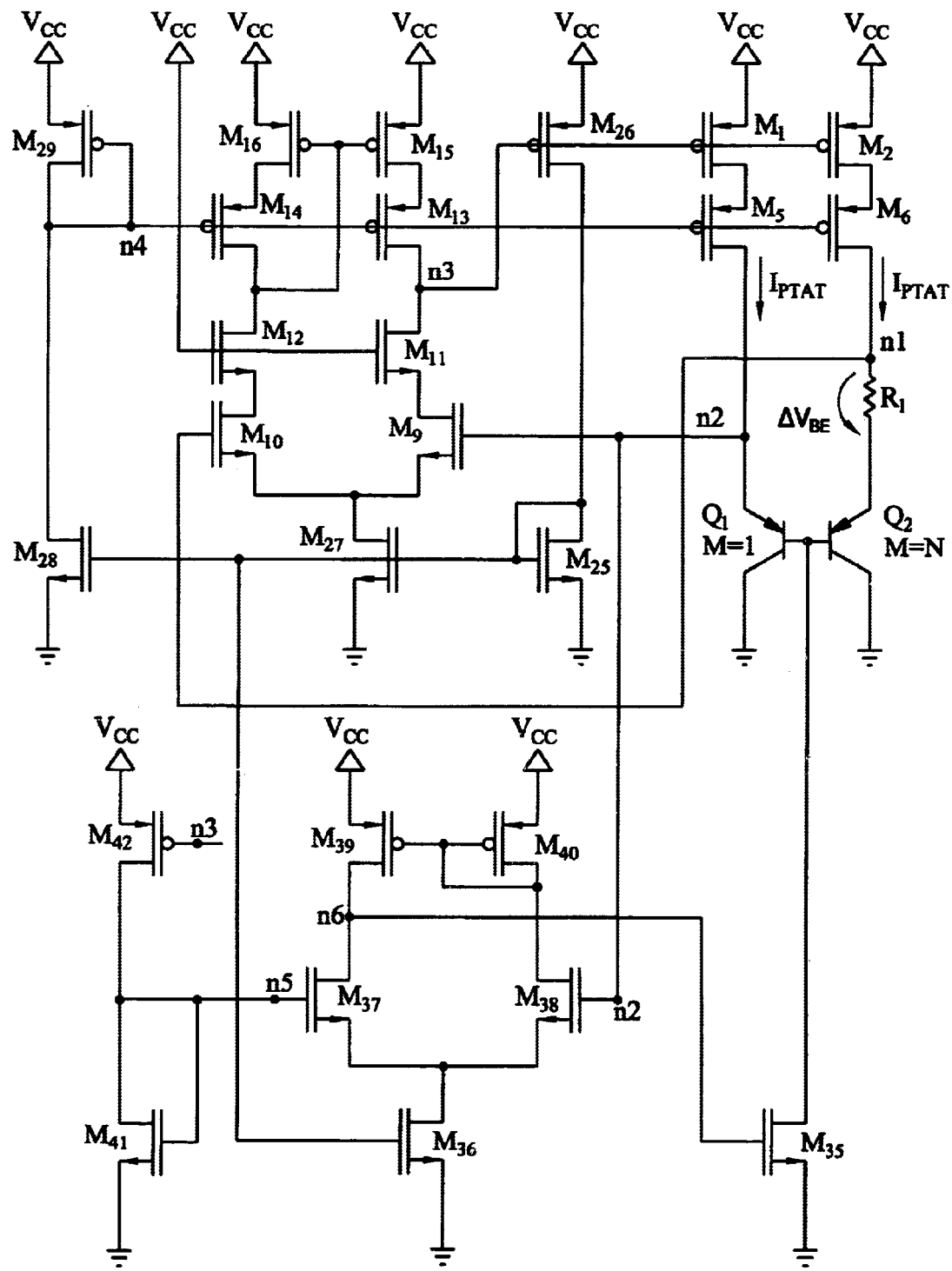
FIG. 7 shows another embodiment of the $I_{PTAT}$ current generator in accordance with the present invention.

One solution to this issue is shown in FIG. 7 which shows another embodiment of the $I_{PTAT}$ current generator 405. In this embodiment, the base of $Q_1$ and resistor $R_2$ are disconnected from ground and driven by a secondary biasing loop, implemented with transistors $M_{35}$–$M_{42}$.

The secondary biasing loop ensures that the voltage at nodes $n_1$ and $n_2$ is sufficiently high so that transistors $M_9$ and $M_{10}$ are properly biased. First, the secondary biasing loop makes the voltage at node $n_2$ equal to the voltage at node $n_5$. To see this, assume the voltage at node $n_5$ is higher than the voltage at node $n_2$. Transistors $M_{39}$ and $M_{40}$ are connected in a current mirror configuration to sink the same current to drive the drains of transistors $M_{37}$ and $M_{38}$. With node $n_5$ above node $n_2$, transistor $M_{37}$ turns on more than transistor $M_{38}$, which causes the voltage at node $n_6$ to drop. When the voltage at node $n_6$ drops, transistor $M_{35}$ turns off to a greater degree. This increases the voltage at the base of transistor $Q_1$ which causes transistor $Q_1$ to turn off more and the voltage at node $n_2$ to increase. As described above, transistors $M_9$–$M_{16}$ work together with current sources $M_1$–$M_5$ and $M_2$–$M_6$ to drive the voltage on nodes $n_1$ and $n_2$ to equal values. So when node $n_2$ increases, node $n_1$ also increases.

Transistor $M_{42}$ provides a replica $I_{PTAT}$ current. Transistor $M_{41}$ is connected as a two-terminal resistor, and is chosen such that the voltage at node $n_5$ is sufficiently high to bias transistor $M_{37}$. Transistor $M_{36}$ sinks a current equal to $I_{PTAT}$, thereby supplying the differential pair $M_{37}$–$M_{38}$ with a constant bias current.

FIG. 8

Figure 8:
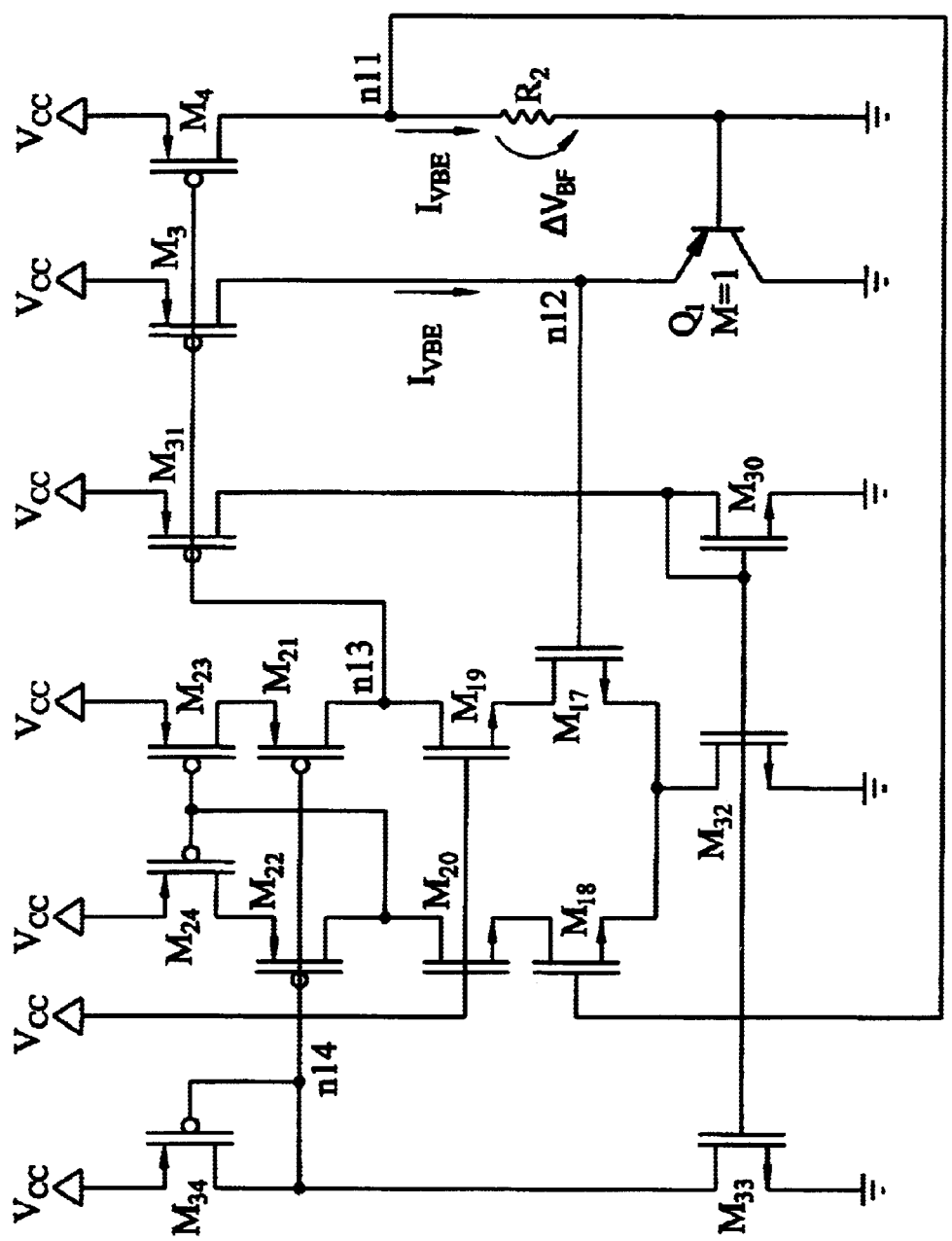
FIG. 8 shows an embodiment of the $I_{VBE}$ current generator in accordance with the present invention.

FIG. 8 shows an embodiment of the $I_{VBE}$ current generator 410 in accordance with the present invention. As in FIG. 3, this implementation comprises pnp bipolar transistor $Q_3$ and resistor $R_2$. Current sources $I_3$ and $I_4$ in FIG. 3 are implemented with transistors $M_3$ and $M_4$ in FIG. 8. Opamp $A_2$ in FIG. 3 is implemented with transistors $M_{17}$–$M_{24}$ and $M_{30}$–$M_{34}$ in FIG. 8.

The operation of transistors $M_3$–$M_4$ is similar to the operation of transistors $M_1$–$M_2$, as described above with respect to FIG. 5. The magnitude of the current $I_{VBE}$ generated by transistors $M_3$–$M_4$ is substantially equal.

The implementation of opamp $A_2$ with transistors $M_{17}$–$M_{24}$ and $M_{30}$–$M_{34}$ in FIG. 8 is similar to the implementation of opamp $A_1$ with transistors $M_9$–$M_{16}$ and $M_{25}$–$M_{29}$, as described above. Nodes $n_{11}$–$n_{14}$ in FIG. 8 correspond to nodes $n_1$–$n_4$ in FIG. 5.

As with the circuit of FIG. 5, the circuit of FIG. 8 uses only substrate pnp bipolar devices, the operating supply voltage could be below 1 V, and one of ordinary skill in the art would understand that a separate circuit is needed to avoid a stable state with zero currents in all branches.

FIG. 9

Figure 9:
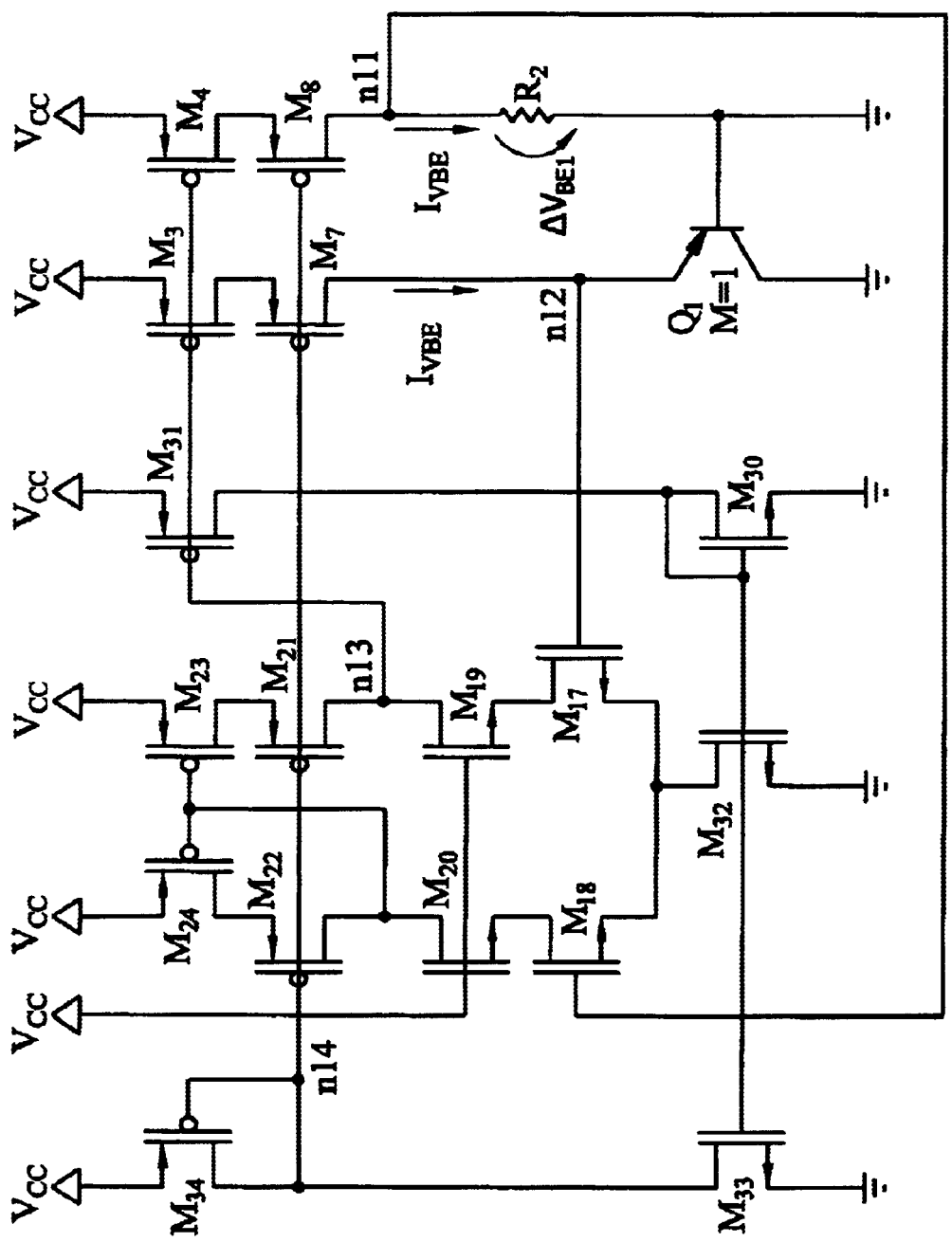
FIG. 9 shows another implementation of the $I_{VBE}$ current generator in accordance with the present invention.

FIG. 9 shows another embodiment of the $I_{VBE}$ current generator 410. The only difference between the circuit of FIG. 9 and the circuit of FIG. 8 is that current sources $M_3$ and $M_4$ are cascoded with transistors $M_7$ and $M_8$, respectively. As explained above, cascoding the current sources improves the power supply rejection, at the expense of a slightly larger minimum operating voltage. The bias current source $M_{31}$ could also be implemented with a cascode device in accordance with the present invention, at the expense of a more complicated start-up circuit.

FIG. 10

Figure 10:
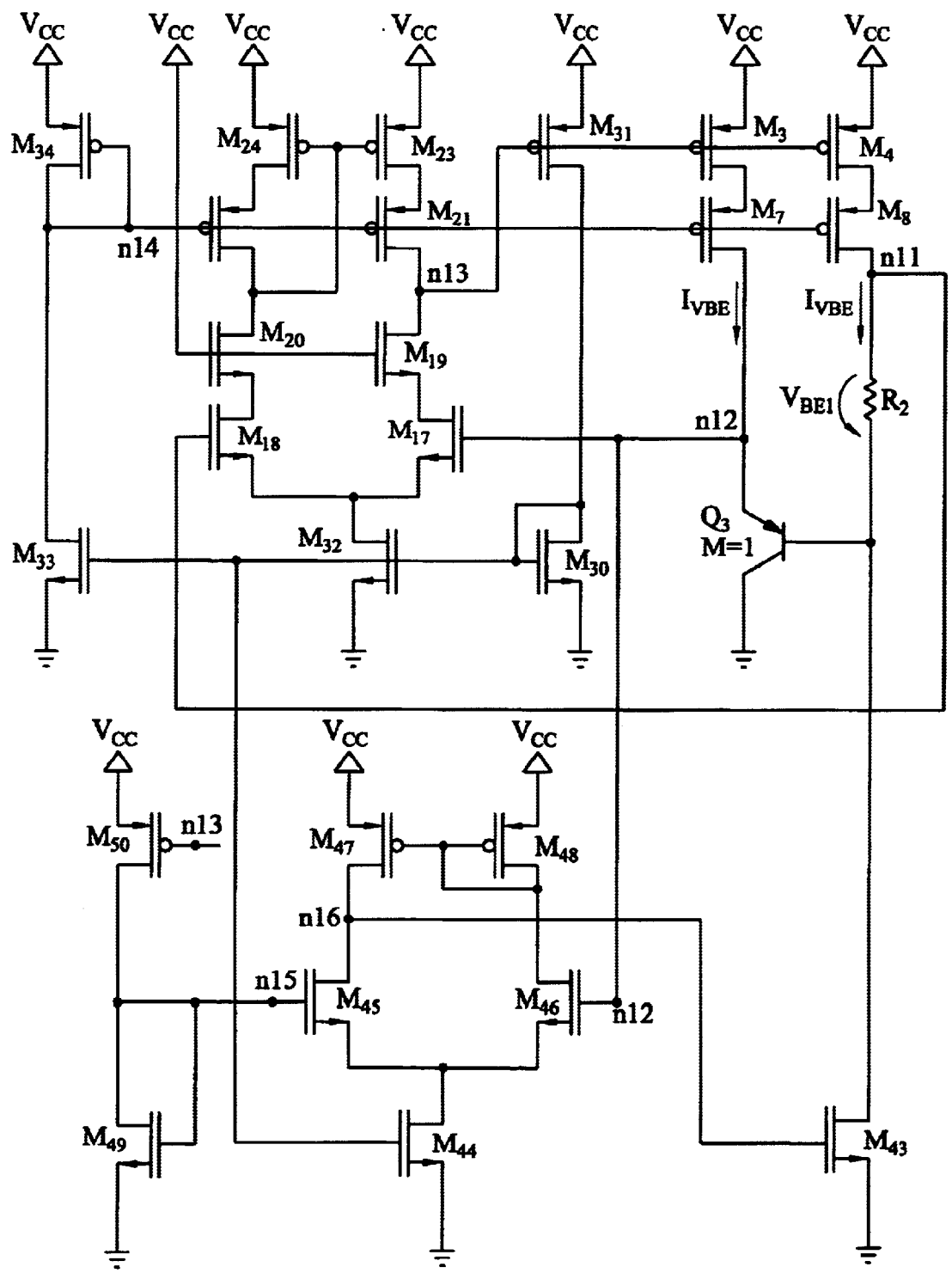
FIG. 10 shows another implementation of the $I_{VBE}$ current generator in accordance with the present invention.

FIG. 10 shows another embodiment of the $I_{VBE}$ current generator 405. This embodiment includes a secondary biasing loop to ensure that the voltage at nodes $n_{11}$ and $n_{12}$ is sufficiently high so that transistors $M_{17}$ and $M_{18}$ are properly biased.

The secondary biasing loop is implemented with transistors $M_{43}$–$M_{50}$. Transistors $M_{43}$–$M_{50}$ function in a manner similar to $M_{35}$–$M_{42}$, which were described above with respect to FIG. 7. Nodes $n_{11}$–$n_{16}$ in FIG. 10 correspond to nodes $n_1$–$n_6$ in FIG. 7.

FIG. 11

Figure 11:
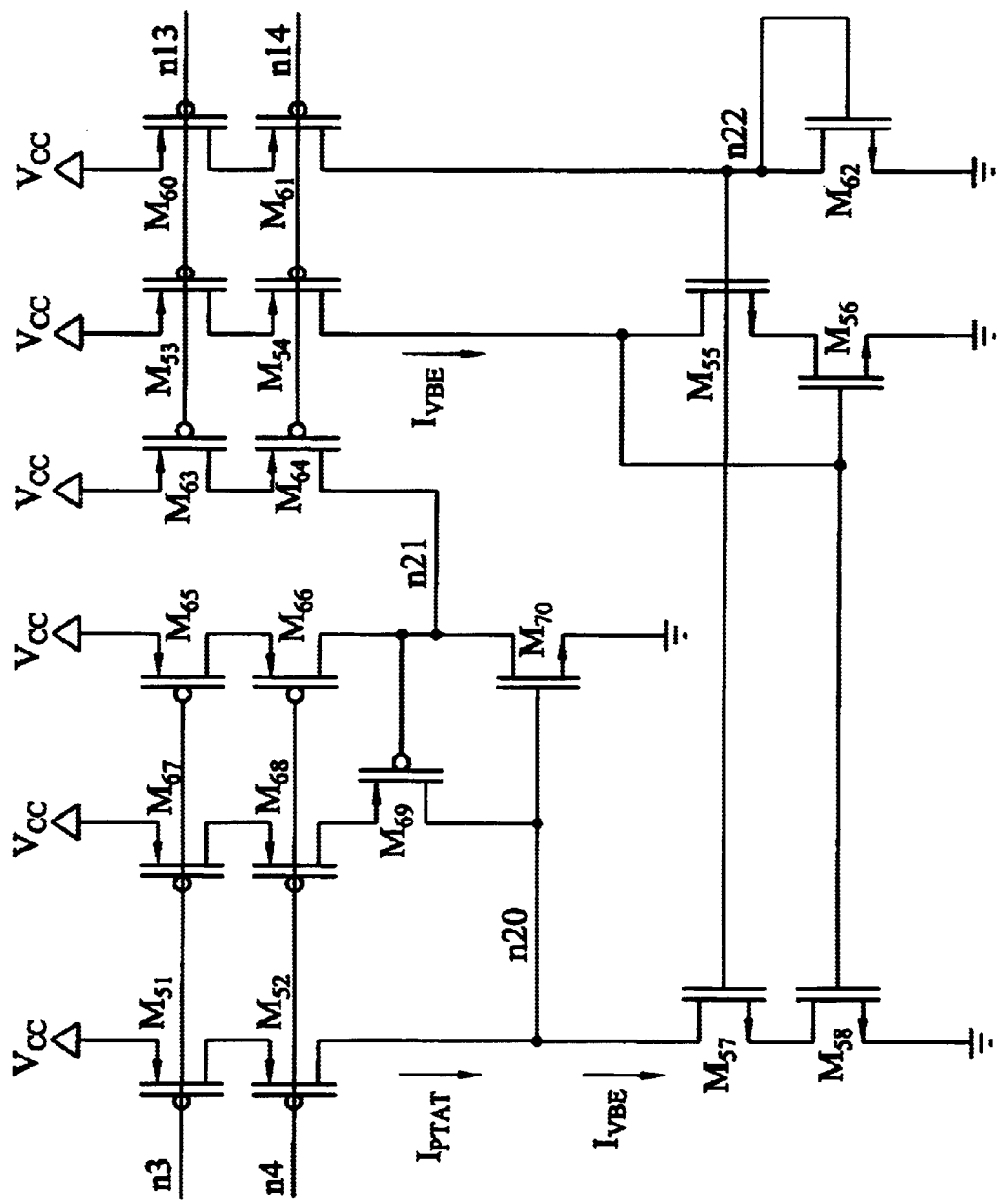
FIG. 11 shows an embodiment of the current comparator in accordance with the present invention.

FIG. 11 shows an embodiment of the current comparator 415 in FIG. 4. Nodes $n_3$ and $n_4$ are the corresponding bias nodes from the PTAT current generator, while nodes $n_{13}$ and $n_{14}$ are the corresponding bias nodes from the $V_{BE}$ current generator.

Transistor pairs $M_{51}$–$M_{52}$ and $M_{53}$–$M_{54}$ match transistor pairs $M_1$–$M_5$ and $M_3$–$M_7$ (from FIGS. 6–7 and 9–10). When the gates of transistor pairs $M_{51}$–$M_{52}$ are biased with nodes $n_3$ and $n_4$ respectively, a replica $I_{PTAT}$ current is generated that enters node $n_{20}$. When the gates of transistors $M_{53}$–$M_{54}$ are biased with nodes $n_{13}$ and $n_{14}$, respectively, a replica $I_{VBE}$ current is generated that enters the drain of transistor $M_{55}$. Transistors $M_{55}$–$M_{58}$ form a current mirror, so that transistors $M_{57}$–$M_{58}$ sink a replica $I_{VBE}$ current that exits node $n_{20}$.

Transistor pair $M_{60}$–$M_{61}$ also matches transistor pair $M_3$–$M_7$. Transistor $M_{62}$ is connected as a two-terminal resistor, and is chosen such that the voltage at node $n_{22}$ is sufficiently high to bias transistor $M_{55}$.

The replica PTAT and $V_{BE}$ currents are compared at the summing node $n_{20}$. If $I_{VBE}$ is larger than $I_{PTAT}$, the voltage at node $n_{20}$ decreases until transistors $M_{57}$–$M_{58}$ begin operating in the linear region to sink the $I_{PTAT}$ current value. At this point, the equilibrium voltage at node $n_{20}$ is much less than the threshold voltage of $M_{70}$, so the current comparator output at node $n_{21}$ is high. Conversely, if $I_{PTAT}$ is larger than $I_{VBE}$, the voltage at node $n_{20}$ increases until transistors $M_{51}$–$M_{52}$ enter the linear region to source a current value equal to $I_{VBE}$. In this case, the equilibrium voltage at node $n_{20}$ is much larger than the threshold value of transistor $M_{70}$, so the current comparator output at node $n_{21}$ is low.

The total current at the output node $n_{21}$ can be made roughly temperature independent by rationing the $V_{BE}$ and PTAT currents through transistor pairs $M_{63}$–$M_{64}$ and $M_{65}$–$M_{66}$.

Transistors $M_{67}$–$M_{68}$ are smaller than transistors $M_{51}$–$M_{52}$. This creates a reduced version of the PTAT current that is gated into the summing node $n_{20}$ by the transistor $M_{69}$, driven by the output node $n_{21}$. This configuration enables a hysteresis behavior with the width of the hysteresis determined by the relative ratios of the currents through $M_{51}$ and $M_{67}$, which can be easily designed by the geometry of the two devices.

Cascode devices $M_{52}$, $M_{54}$, $M_{61}$, and $M_{68}$ improve the power-supply rejection.

FIG. 12

One way to test a low-voltage thermostat circuit is to heat or cool the circuit to the desired temperature and do the testing or tuning at that temperature. This method would also enable one to tune the exact crossing point. The problem with this method is that it is very expensive.

Figure 12:
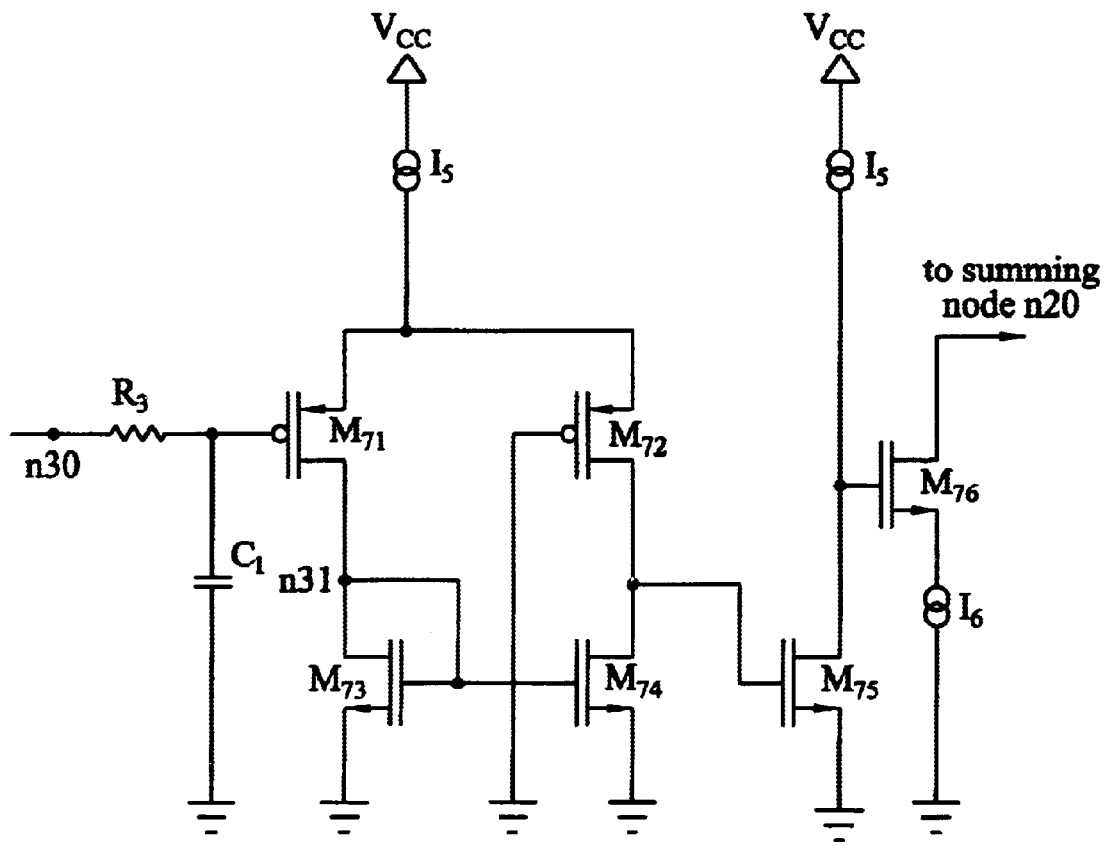
FIG. 12 shows a circuit which can be used in order to test or tune a low-voltage thermostat circuit in accordance with the present invention.

FIG. 12 shows a circuit which can be used in order to test or tune a low-voltage thermostat circuit in accordance with the present invention at room temperature. This circuit comprises transistors $M_{71}$–$M_{76}$, current sources $I_5$ and $I_6$, resistor $R_3$, and capacitor $C_1$.

When transistor $M_{76}$ is turned on, current $I_6$ is added into or subtracted from the summing node $n_{20}$. This alters the ratio of $I_{PTAT}$ and $I_{VBE}$, which is equivalent to shifting the temperature of the device. Because $I_6$ can be a well-defined fraction of $I_{VBE}$ or $I_{PTAT}$, the temperature shift can be known.

The functionality of the circuit in FIG. 12 is based on forcing node $n_{30}$ below ground potential. Transistors $M_{71}$–$M_{75}$ form a differential amplifier which has a built-in offset of 200–300 mV. This offset is created by unbalancing the geometry of input transistors $M_{71}$–$M_{72}$. If the voltage at node $n_{30}$ is below ground by more than this built-in offset, the output of this amplifier becomes active and the test circuit can inject or subtract current $I_6$ into the summing node $n_{20}$ of the current comparator.

The $R_3$–$C_1$, filter rejects narrow spikes, to prevent noise that would otherwise put the circuit in test mode. Current source $I_5$ is used to properly bias the differential amplifier.

Because one embodiment of the thermostat circuit in accordance with the present invention has only three terminals (power, ground, and output), it fits very well into very small packages. It is preferable for the testing/tuning circuit not to add additional output pads.

CONCLUSION

Although the present invention has been described above with particularity, this was merely to teach one of ordinary skill in the art how to make and use the invention. The present invention is not limited to the above embodiments. Many additional modifications will also fall within the scope of the invention, as that scope is defined by the claims which follow.

What is claimed is:

1. A thermostat circuit, comprising:
   a first subcircuit for generating a first reference value that is directly proportional to absolute temperature, a second subcircuit for generating a second reference value that is inversely proportional to absolute temperature, and an output;
   wherein the output is a first logic state when the first reference value is higher than the second reference value, and the output is a second logic state when the second reference value is higher than the first reference value.

2. The thermostat circuit of claim 1, wherein the first reference value is a first reference current; and the second reference value is a second reference current.

3. The thermostat circuit of claim 2, wherein:
   the first subcircuit comprises a first bipolar junction transistor (BJT) (Q1) comprising an emitter, a collector, and a base; and a second BJT (Q2) comprising an emitter, a collector, and a base;
   the second subcircuit comprises a third BJT (Q3) comprising an emitter, a collector, and a base;
   the first reference current is proportional to the difference in the base-emitter voltage between the first BJT (Q1) and second BJT (Q2); and
   the second reference current is proportional to the base-emitter voltage of the third BJT (Q3).

4. The thermostat circuit of claim 2, further comprising:
   a summing node at which the first reference current and second reference current are added; and
   a current source that can inject a test current into or subtract a test current from the summing node.

5. The thermostat circuit of claim 3,
   wherein the first subcircuit further comprises:
      a first operational amplifier (opamp) (A1) comprising an inverting input (−), a noninverting input (+), and an output;
      a first resistor (R1) comprising a first terminal connected to the noninverting input (+) of the first opamp (A1), and a second terminal connected to the emitter of the second BJT (Q2);
      a first current source (I1) connected to the output of the first opamp (A1), the inverting input (−) of the first opamp (A1), and the emitter of the first BJT (Q1); and
      a second current source (I2) connected to the first current source (I1) and the first terminal of the first resistor (R1); and
   wherein the second subcircuit further comprises:
      a second opamp (A2), comprising an inverting input (−), a noninverting input (+), and an output;
      a second resistor (R2) comprising a first terminal and a second terminal connected to ground;
      a third current source (I3) connected to the output of the second opamp (A2), the inverting input (−) of the second opamp (A2), and the emitter of the third BJT (Q3); and
      a fourth current source (I4) connected to the third current source (I3), the noninverting input (+) of the second opamp (A2), and the first terminal of the second resistor (R2).

6. The thermostat circuit of claim 5, wherein:
   the first current source (I1) comprises a first transistor (M1) comprising a source connected to Vcc, a gate connected to the output of the first opamp (A1), and a drain;
   the second current source (I2) comprises a second transistor (M2) comprising a source connected to Vcc, a gate connected to the gate of the first transistor (M1), and a drain;
   the third current source (I3) comprises a third transistor (M3) comprising a source connected to Vcc, a gate connected to the output of the second opamp (A2), and a drain; and
   the fourth current source (I4) comprises a fourth transistor (M4) comprising a source connected to Vcc, a gate connected to the gate of the third transistor (M3), and a drain.

7. The thermostat circuit of claim 6, wherein:
   the first current source (I1) further comprises a fifth transistor (M5) comprising a source connected to the drain of the first transistor (M1), a gate, and a drain connected to the emitter of the first BJT (Q1) and the inverting input (−) of the first opamp (A1);
   the second current source (I2) further comprises a sixth transistor (M6) comprising a source connected to the drain of the second transistor (M2), a gate connected to the gate of the fifth transistor (M5), and a drain connected to the first terminal of the first resistor (R1) and the noninverting input (+) of the first opamp (A1);
   the third current source (I3) further comprises a seventh transistor (M7) comprising a source connected to the drain of the third transistor (M3), a gate, and a drain connected to the inverting input (−) of the second opamp (A2); and
   the fourth current source (I4) further comprises an eighth transistor (M8) comprising a source connected to the drain of the fourth transistor (M4), a gate connected to the gate of the seventh transistor (M7), and a drain connected to the noninverting (+) input of the second opamp (A2) and the first terminal of the second resistor (R2).

8. The thermostat circuit of claim 5, wherein the first opamp (A1) comprises a cascode amplifier, and the second opamp (A2) comprises a cascode amplifier.

9. The thermostat circuit of claim 7, wherein:
   the first opamp (A1) further comprises:
      a ninth transistor (M9) comprising a source, a gate connected to the inverting input (−) of the first opamp (A1), and a drain;

a tenth transistor (M10) comprising a source connected to the source of the ninth transistor (M9), a gate connected to the noninverting input (+) of the first opamp (A1), and a drain;

an eleventh transistor (M11) comprising a source connected to the drain of the ninth transistor (M9), a gate, and a drain connected to the output of the first opamp (A1);

a twelfth transistor (M12) comprising a source connected to the drain of the tenth transistor (M10), a gate connected to Vcc and to the gate of the eleventh transistor (M11), and a drain;

a thirteenth transistor (M13) comprising a source, a gate, and a drain connected to the output of the first opamp (A1);

a fourteenth transistor (M14) comprising a source, a gate connected to the gate of the thirteenth transistor (M13), and a drain connected to the drain of the twelfth transistor (M12);

a fifteenth transistor (M15) comprising a source connected to Vcc, a gate connected to the drain of the twelfth transistor (M12), and a drain connected to the source of the thirteenth transistor (M13);

a sixteenth transistor (M16) comprising a source connected to Vcc, a gate connected to the gate of the fifteenth transistor (M15), and a drain connected to the source of the fourteenth transistor (M14); and the second opamp (A2) further comprises:

a seventeenth transistor (M17) comprising a source, a gate connected to the inverting input (−) of the second opamp (A2), and a drain;

an eighteenth transistor (M18) comprising a source connected to the source of the seventeenth transistor (M17), a gate connected to the noninverting input (+) of the second opamp (A2), and a drain;

a nineteenth transistor (M19) comprising a source connected to the drain of the seventeenth transistor (M17), a gate, and a drain connected to the output of the second opamp (A2);

a twentieth transistor (M20) comprising a source connected to the drain of the eighteenth transistor (M18), a gate connected to Vcc and to the gate of the nineteenth transistor (M19), and a drain;

a twenty-first transistor (M21) comprising a source, a gate, and a drain connected to the drain of the nineteenth transistor (M19);

a twenty-second transistor (M22) comprising a source, a gate connected to the gate of the twenty-first transistor (M21), and a drain connected to the drain of the twentieth transistor (M20);

a twenty-third transistor (M23) comprising a source connected to Vcc, a gate connected to the drain of the twentieth transistor (M20), and a drain connected to the source of the twenty-first transistor (M21); and a twenty-fourth transistor (M24) comprising a source connected to Vcc, a gate connected to the gate of the twenty-third transistor (M23), and a drain connected to the source of the twenty-second transistor (M22).

10. The thermostat circuit of claim 9, wherein:

the first opamp (A1) further comprises:

a twenty-fifth transistor (M25) comprising a source connected to ground, and a gate and a drain connected together;

a twenty-sixth transistor (M26) comprising a source connected to Vcc, a gate connected to the output of the first opamp (A1), and a drain connected to the drain of the twenty-fifth transistor (M25);

a twenty-seventh transistor (M27) comprising a source connected to ground, a gate connected to the gate of the twenty-fifth transistor (M25), and a drain connected to the source of the ninth transistor (M9);

a twenty-eighth transistor (M28) comprising a source connected to ground, a gate connected to the gate of the twenty-seventh transistor (M27), and a drain connected to the gate of the fourteenth transistor (M14); and a twenty-ninth transistor (M29) comprising a source connected to Vcc, and a gate and drain connected together and to the gate of the fourteenth transistor (M14); and the second opamp (A2) further comprises:

a thirtieth transistor (M30) comprising a source connected to ground, and a gate and a drain connected together;

a thirty-first transistor (M31) comprising a source connected to Vcc, a gate connected to the output of the second opamp (A2), and a drain connected to the drain of the thirtieth transistor (M30);

a thirty-second transistor (M32) comprising a source connected to ground, a gate connected to the gate of the thirtieth transistor (M30), and a drain connected to the source of the seventeenth transistor (M17);

a thirty-third transistor (M33) comprising a source connected to ground, a gate connected to the gate of the thirty-second transistor (M32), and a drain connected to the gate of the twenty-second transistor (M22); and a thirty-fourth transistor (M34) comprising a source connected to Vcc, and a gate and a drain connected together and to the gate of the twenty-second transistor (M22).

11. The thermostat circuit of claim 10, wherein the first subcircuit further comprises:

a thirty-fifth transistor (M35) comprising a source connected to ground, a gate, and a drain connected to the base of the first BJT (Q1) and the base of the second BJT (Q2);

a thirty-sixth transistor (M36) comprising a source connected to ground, a gate connected to the gate of the twenty-seventh transistor (M27), and a drain;

a thirty-seventh transistor (M37) comprising a source connected to the drain of the thirty-sixth transistor (M36), a gate, and a drain connected to the gate of the thirty-fifth transistor (M35);

a thirty-eighth transistor (M38) comprising a source connected to the drain of the thirty-sixth transistor (M36), a gate connected to the emitter of the first BJT (Q1), and a drain;

a thirty-ninth transistor (M39) comprising a source connected to Vcc, a gate connected to the drain of the thirty-eighth transistor (M38), and a drain connected to the drain of the thirty-seventh transistor (M37);

a fortieth transistor (M40) comprising a source connected to Vcc, a gate connected to the gate of the thirty-ninth transistor (M39), and a drain connected to the drain of the thirty-eighth transistor (M38);

a forty-first transistor (M41) comprising a source connected to ground, a gate connected to the gate of the thirty-seventh transistor (M37), and a drain;

a forty-second transistor (M42) comprising a source connected to Vcc, a gate connected to the drain of the thirteenth transistor (M13), and a drain connected to the drain of the forty-first transistor (M41); and wherein the second subcircuit further comprises:
a forty-third transistor (M43) comprising a source connected to ground, a gate, and a drain connected to the base of the third BJT (Q3) and the second terminal of the second resistor (R2);
a forty-forth transistor (M44) comprising a source connected to ground, a gate connected to the gate of the thirty-second transistor (M32), and a drain;
a forty-fifth transistor (M45) comprising a source connected to the drain of the forty-forth transistor (M44), a gate, and a drain connected to the gate of the forty-third transistor (M43);
a forty-sixth transistor (M46) comprising a source connected to the drain of the forty-fourth transistor (M44), a gate connected to the emitter of the third BJT (Q3), and a drain;
a forty-seventh transistor (M47) comprising a source connected to Vcc, a gate connected to the drain of the forty-sixth transistor (M46), and a drain connected to the drain of the forty-fifth transistor (M45);
a forty-eighth transistor (M48) comprising a source connected to Vcc, a gate connected to the gate of the forty-seventh transistor (M47), and a drain connected to the drain of the forty-sixth transistor (M46);
a forty-ninth transistor (M49) comprising a source connected to ground, a gate connected to the gate of the forty-fifth transistor (M45), and a drain; and
a fiftieth transistor (M50) comprising a source connected to Vcc, a gate connected to the drain of the twenty-first transistor (M21), and a drain connected to the drain of the forty-ninth transistor (M49).

12. The thermostat circuit of claim 11, further comprising:
a fifty-first transistor (M51) comprising a source connected to Vcc, a gate connected to the drain of the thirteenth transistor (M13), and a drain;
a fifty-second transistor (M52) comprising a source connected to the drain of the fifty-first transistor (M51), a gate connected to the gate of the twenty-ninth transistor (M29), and a drain;
a fifty-third transistor (M53) comprising a source connected to Vcc, a gate connected to the drain of the twenty-first transistor (M21), and a drain;
a fifty-fourth transistor (M54) comprising a source connected to the drain of the fifty-third transistor (M53), a gate connected to the gate of the thirty-fourth transistor (M34); and a drain;
a fifty-fifth transistor (M55) comprising a source, a gate, and a drain connected to the drain of the fifty-fourth transistor (M54);
a fifty-sixth transistor (M56) comprising a source connected to ground, a gate connected to the drain of the fifty-fifth transistor (M55), and a drain connected to the source of the fifty-fifth transistor (M55);
a fifty-seventh transistor (M57) comprising a source, a gate connected to the gate of the fifty-fifth transistor (M55), and a drain connected to the drain of the fifty-second transistor (M52);
a fifty-eighth transistor (M58) comprising a source connected to ground, a gate connected to the gate of the fifty-sixth transistor (M56), and a drain connected to the source of the fifty-seventh transistor (M57);
a sixtieth transistor (M60) comprising a source connected to Vcc, a gate connected to the gate of the fifty-third transistor (M53), and a drain;
a sixty-first transistor (M61) comprising a source connected to the drain of the sixtieth transistor (M60), a gate connected to the gate of the fifty-fourth transistor (M54), and a drain;
a sixty-second transistor (M62) comprising a source connected to ground, and a gate connected to its drain and to the gate of the fifty-fifth transistor (M55) and the drain of the sixty-first transistor (M61);
a sixty-third transistor (M63) comprising a source connected to Vcc, a gate connected to the gate of the fifty-third transistor (M53), and a drain;
a sixty-fourth transistor (M64) comprising a source connected to the drain of the sixty-third transistor (M63), a gate connected to the gate of the fifty-fourth transistor (M54); and a drain connected to the output node (n21);
a sixty-fifth transistor (M65) comprising a source connected to Vcc, a gate connected to the gate of the fifty-first transistor (M51), and a drain;
a sixty-sixth transistor (M66) comprising a source connected to the drain of the sixty-fifth transistor (M65), a gate connected to the gate of the fifty-second transistor (M52), and a drain connected to the output node (n21);
a sixty-seventh transistor (M67) comprising a source connected to Vcc, a gate connected to the gate of the sixty-fifth transistor (M65), and a drain;
a sixty-eighth transistor (M68) comprising a source connected to the drain of the sixty-seventh transistor (M67), a gate connected to the gate of the sixty-sixth transistor (M66); and a drain; and
a sixty-ninth transistor (M69) comprising a source connected to the drain of the sixty-eighth transistor (M68), a gate connected to the output node (n21), and a drain connected to the gate of the fifty-ninth transistor (M59);
a seventieth transistor (M70) comprising a source connected to ground, a gate connected to the drain of the fifty-seventh transistor (M57), and a drain; and
an output node (n21) connected to the drain of the seventieth transistor (M70).

13. The thermostat circuit of claim 12, further comprising:
a fifth current source (I5);
a sixth current source (I6);
a seventy-first transistor (M71) comprising a source connected to the fifth current source (I5), a gate, and a drain;
a seventy-second transistor (M72) comprising a source connected to the fifth current source (I5), a gate connected to ground, and a drain;
a seventy-third transistor (M73) comprising a source connected to ground, and a gate connected to its drain and to the drain of the seventy-first transistor (M71);
a seventy-fourth transistor (M74) comprising a source connected to ground, a gate connected to the gate of the seventy-third transistor (M73), and a drain connected to the drain of the seventy-second transistor (M72);
a seventy-fifth transistor (M75) comprising a source connected to ground, a gate connected to the drain of the seventy-second transistor (M72), and a drain connected to the fifth current source (I5);
a seventy-sixth transistor (M76) comprising a source connected to the sixth current source, a gate connected to the fifth current source, and a drain connected to the drain of the fifty-seventh transistor (M57);
a first capacitor (C1) comprising a first terminal connected to the gate of the seventy-first transistor (M71) and a second terminal connected to ground; and
a third resistor (R3) comprising a first terminal connected to the gate of the seventy-first transistor (M71).

* * * * *